United States Patent [19]
Levinthal et al.

[11] Patent Number: 5,045,995
[45] Date of Patent: Sep. 3, 1991

[54] SELECTIVE OPERATION OF PROCESSING ELEMENTS IN A SINGLE INSTRUCTION MULTIPLE DATA STREAM (SIMD) COMPUTER SYSTEM

[75] Inventors: Adam E. Levinthal, Corte Madera; Thomas K. Porter, Fairfax, both of Calif.; Thomas D. S. Duff, No. Plainfield, N.J.; Loren C. Carpenter, Novato, Calif.

[73] Assignee: Vicom Systems, Inc., San Jose, Calif.

[21] Appl. No.: 622,229

[22] Filed: Dec. 3, 1990

Related U.S. Application Data

[63] Continuation of Ser. No. 175,621, Mar. 25, 1988, abandoned, which is a continuation of Ser. No. 748,409, Jun. 24, 1985, abandoned.

[51] Int. Cl.$^5$ .................... G06F 15/16; G06F 15/80
[52] U.S. Cl. .................... 364/200; 364/261.5; 364/228.3; 364/231.9
[58] Field of Search ................ 364/200, 900

[56] References Cited

U.S. PATENT DOCUMENTS

| | | | |
|---|---|---|---|
| 4,101,960 | 7/1978 | Stokes et al. | 364/200 |
| 4,435,758 | 3/1984 | Lorie et al. | 364/200 |
| 4,574,348 | 3/1986 | Scallon | 364/200 |

OTHER PUBLICATIONS

Levinthal & Porter, "Chap-A SIMD Graphics Processor", *Computer Graphics*, vol. 18, No. 3, 7/84, pp. 77-82.
Barnes, et al., "The Zlliac IV Computer", *IEEE Transactions on Computers*, vol. C-17, No. 8, 8/68, pp. 746-757.
Evensen & Troy, "Introduction to the Architecture of 288-Element PEEE", Proceedings of the 1973 Sagamore Conf. on Parallel Processing, pp. 162-169.
Siegel, "Controlling The Active/Inactive Status of SIMD Machine Processors", Proceedings of the 1977 International Conf. on Parallel Processing, p. 183.
Kubo et al., "A Parallel Processor System Dedicated to SIMD and its Application to Three-Dimensional Color Graphics", pp. 870-875.
Berg et al., "Pepe-An Overview of Architecture, Operation, and Implementation", Honeywell Systems and Research Center, pp. 312-316.
Dingeldine et al., "Operating System and Support Software for PEPE", Proceedings of the 1973 Sagamore Conf. on Parallel Processing, pp. 170-178.
Flynn, "Some Computer Organizations and their Effectiveness", *IEEE Transactions on Computers*, vol. C-21, No. 9, 9/72, pp. 948-960.
Thurber & Wald, "Associative and Parallel Processors", *Computing Surveys*, vol. 7, No. 4, Dec. 1975, pp. 215-255.
Microprogramming Handbook of Advanced Micro Devices, Inc., 1977.

*Primary Examiner*—Eddie P. Chan
*Attorney, Agent, or Firm*—Hecker & Harriman

[57] ABSTRACT

A plurality of processing elements independently operate in parallel on separate streams of data but in response to common instructions. In order to selectively and individually enable each processing element, a control register stage is provided for each. Each register may be controlled, as between its enabling and disabling states with respect to execution of a common instruction, by the results of a test performed by its associated processor in response to a prior instruction and by the complement of the test results. The system is especially adapted to support flow of control operators, such as IF/THEN constructs, IF/THEN/ELSE constructs and WHILE/DO loop constructs.

3 Claims, 4 Drawing Sheets

| STATUS INSTRUCTION (BUS 43) | LOGICAL OPERATION (BUS 35) | CIRCUIT FUNCTION | CIRCUIT OPERATION |
|---|---|---|---|
| 0 | STATEMENT | HOLD | Q = Q |
| 1 | IF | LATCH TEST RESULT | Q = TEST RESULT |
| 2 | END IF | SET | Q = 1 |
| 3 | ELSE | COMPLEMENT | Q = !Q |

| LOGICAL OPERATION (BUS 35) | TEST RESULT (LINE 45) | ENABLE (LINES 39) (RUN FLAG) | STATUS INSTRUCTION (BUS 43) |
|---|---|---|---|
| 1 STATEMENT | | 1111 | 0 |
| 2 IF ($D_I > 1$) | 1010 | 1010 | 1 |
| 3 STATEMENT ($D_O = 1$) | | 1010 | 0 |
| 4 ELSE | | 0101 | 3 |
| 5 STATEMENT ($D_O = D_I$) | | 0101 | 0 |
| 6 END IF | | 1111 | 2 |

| | Test Result (Line 45) | Enable (Line 39) (Row Flags) | Top of Stack 81 | Next to Top of Stack 81 | Status Instru. (Bus 43) |
|---|---|---|---|---|---|
| 1) STATEMENT | | | 1111 | — | 0 |
| 2) IF (C1) | 1100 | 1100 | 1111 | — | 1 |
| 3) STATEMENT | | 1100 | 1111 | | 0 |
| 4) IF (C2) | 1000 | 1000 | 1100 | 1111 | 1 |
| 5) STATEMENT | | 1000 | 1100 | 1111 | 0 |
| 6) ELSE | | 0100 | 1100 | 1111 | 4 |
| 7) STATEMENT | | 0100 | 1100 | 1111 | 0 |
| 8) END IF | | 1100 | 1111 | — | 3 |
| 9) STATEMENT | | 1100 | 1111 | — | 0 |
| 10) ELSE | | 0011 | 1111 | — | 4 |
| 11) STATEMENT | | 0011 | 1111 | — | 0 |
| 12) IF (C3) | 0001 | 0001 | 0011 | 1111 | 1 |
| 13) STATEMENT | | 0001 | 0011 | 1111 | 0 |
| 14) ELSE | | 0010 | 0011 | 1111 | 4 |
| 15) STATEMENT | | 0010 | 0011 | 1111 | 0 |
| 16) END IF | | 0011 | 1111 | — | 3 |
| 17) STATEMENT | | 0011 | 1111 | — | 0 |
| 18) END IF | | 1111 | — | — | 4 |
| 19) STATEMENT | | 1111 | — | — | 2 |

Fig. 7

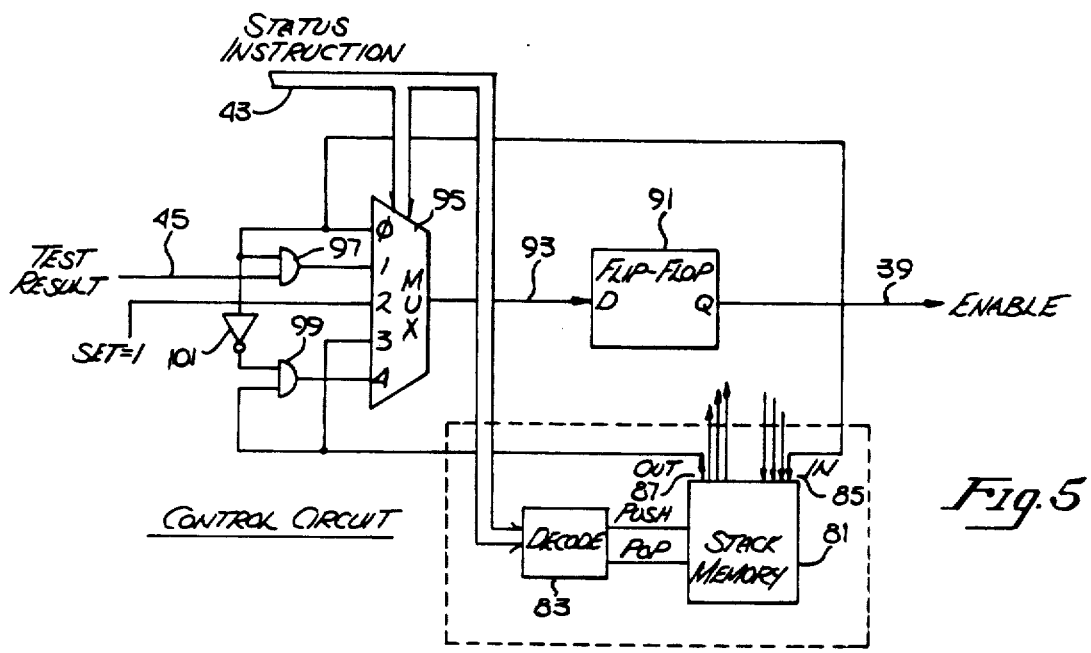
Fig. 5
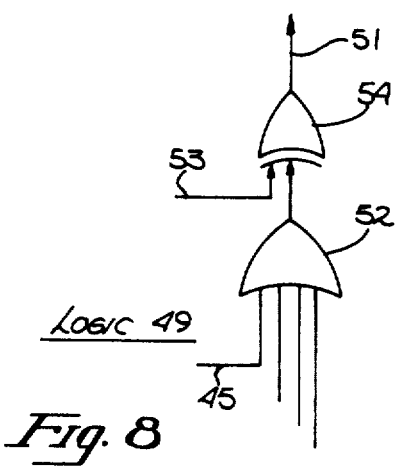
Fig. 6
Fig. 8

SELECTIVE OPERATION OF PROCESSING ELEMENTS IN A SINGLE INSTRUCTION MULTIPLE DATA STREAM (SIMD) COMPUTER SYSTEM

This is a continuation of application Ser. No. 07/175,6721 filed Mar. 25, 1988, now abandoned which is a continuation of application Ser. No. 06/748,409, filed June 24, 1985 now abandoned.

BACKGROUND OF THE INVENTION

This invention relates generally to parallel data processing techniques and computer systems, and specifically to those of a type where each of a plurality of parallel processors simultaneously executes the same instruction on different data. Such a computer is commonly termed a single instruction, multiple data stream (SIMD) processor.

There are many data processing applications wherein multiple streams of data may be processed in the same manner. An example is in the field of computer graphics where separate video red, green, blue and alpha digital signals may be processed identically. To achieve the highest processing rate, it is thus convenient to process these four data streams simultaneously with the same sequence of instructions. That is, at any given instant, separate red, green, blue and alpha data for a particular color display pixel are being simultaneously processed.

Parallel processing is particularly fast if the program being executed on the parallel streams of data is an invariant series of statements. It is more common, however, that the controlling program includes conditional statements that depend for execution upon the data in each of the parallel processors. Since the data being processed in each stream will be different, provision must be made in this case for those processors whose data does not meet the condition of the program statement to be rendered non-operative during the time that the remaining processors are executing the particular statement. It is known that a WHILE-DO construct is the minimum needed to implement all possible flow control structures.

A common example of such a conditional program instruction is an "IF-THEN" statement: that is, the individual processors are all instructed to perform a certain manipulation of their individual data streams, but only "if" their data meets a certain condition expressed in the program instruction. Those processors whose data at that instant do not meet the condition do not execute that instruction. An "IF-THEN" instruction is often augmented by an "ELSE" modifier; that is, those processors not executing the "IF-THEN" statement are subsequently instructed to execute a different operation on their data at the next instant while those processors who did execute the "IF-THEN" instruction are rendered inoperative.

It is a general object of the present invention to provide improved techniques and circuits for selectively controlling which of a plurality of parallel processors execute specific conditional instructions.

SUMMARY OF THE INVENTION

This and additional objects are accomplished by the present invention, wherein, briefly, each of the parallel processors has a separate control element, such as one bit of a control register, that enables the processor to execute a common instruction given all processors when the element is in one state and disables the processor from executing that instruction when in its other state. The state of each control element is set to control execution of a particular statement dependent upon whether the data for that processor met the test of a previous instruction, such as an "IF-THEN" instruction. In subsequent complementary execution, such as occurs in an "ELSE" instruction, the states of the control elements are reversed so that those processors who did not execute the first statement will execute the subsequent statement, and vice versa.

In addition, in order to provide a capability for nested excecution of such complementary types of instructions, a memory device (a stack memory in a preferred embodiment) is provided to store the states of the individual control elements when the nested conditional statement occurs. When execution of the nested instruction is completed, the states of the control elements at the time of the nesting conditional statement are restored so that the processing of them may continue.

Additional objects, features and advantages of the various aspects of the present invention will best be appreciated from a description of its preferred embodiments, which description should be taken in conjunction with the accompanying drawings.

BRIEF DESCRIPTION OF THE DRAWINGS

FIG. 5 illustrates a second circuit embodiment of the control circuits of the system of FIG. 1;

FIGS. 6 and 7 are tables which illustrate the operation of the system of FIG. 1 when implemented with the control circuit of FIG. 5; and FIG. 8 provides logic details of another portion of the circuit of FIG. 1.

DESCRIPTION OF THE PREFERRED EMBODIMENTS

Figure 1:
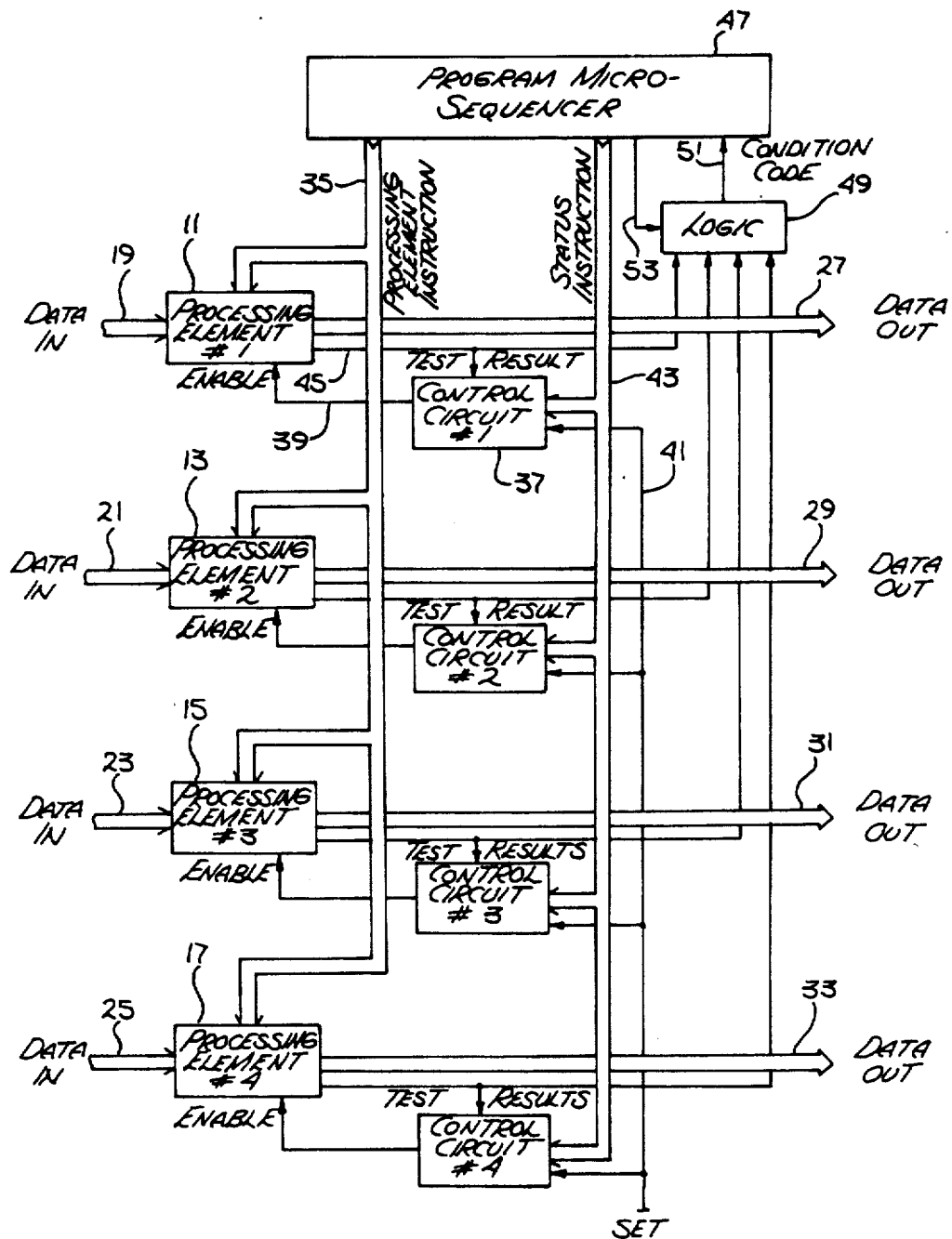
FIG. 1 illustrates in general block diagram form a SIMD processor.

Referring to FIG. 1, the overall architecture of a computer system utilizing the various aspects of the present invention will be described. Separate processors 11, 13, 15 and 17 receive, respectively, independent data streams in input lines 19, 21, 23, and 25. Similarly, independent lines 27, 29, 31, and 33 carry, respectively, the outputs of the processing elements. Four parallel data processors are illustrated in this example, but it will be understood that the principles of the present invention apply to a parallel system containing arbitrarily many parallel processing elements. Four processors are conveniently used in a graphics computer system, one channel used to process data of the red component of a video signal, another for the green component, a third for the blue, and a fourth for an alpha component that provides other information of the image. Parallel processing is particularly adapted for a graphics application since high speed processing is a requirement and the same sequence of program instructions is executed simultaneously on all four data paths.

There are certain program instructions, however, that require one or more processing elements to not participate in executing a particular program instruction that is applied simultaneously through an instruction bus 35 to all four of the processing elements 11, 13, 15 and 17. In order to control which of the four processing elements are active to execute a particular instruction, a control circuit is provided in association with each of them, such as a circuit 37 which controls operation of the processing element 11. A line 39 carries a signal to the processing element 11 which controls whether it is enabled to execute an instruction on the bus 35. For example, a voltage in line 39 representative of a logical "1" will cause the processing element to execute the instruction, while a voltage representative of a logical "0" will disable the processing element during execution of that particular instruction by other of the processing elements.

Each of the four control circuits of the system of FIG. 1, such as the circuit 37, determines whether to enable its associated processing element, such as processor 11, on the basis of several pieces of information. One is an initial condition which is presented external of the circuits of FIG. 1 in a set line 41. Another piece of information is a status instruction in a bus 43 which specifies, for those processor instructions on bus 35 that may require less than all of the processing elements to execute the instruction, additional instructions for determining the state of the enable signal in the line 39. A final piece of information is a true "1" or false "0" signal in a line 45 which gives the result of a test performed by the processing element 11 on its data in response to a current or immediately proceeding instruction on the bus 35. Each of the four control circuits shown in FIG. 1 operates similarly, except that the test result input received from its associated processing element can be different and thus result in some processors being enabled and others being disabled at a given instant in time.

Figures 2, 3, 4:
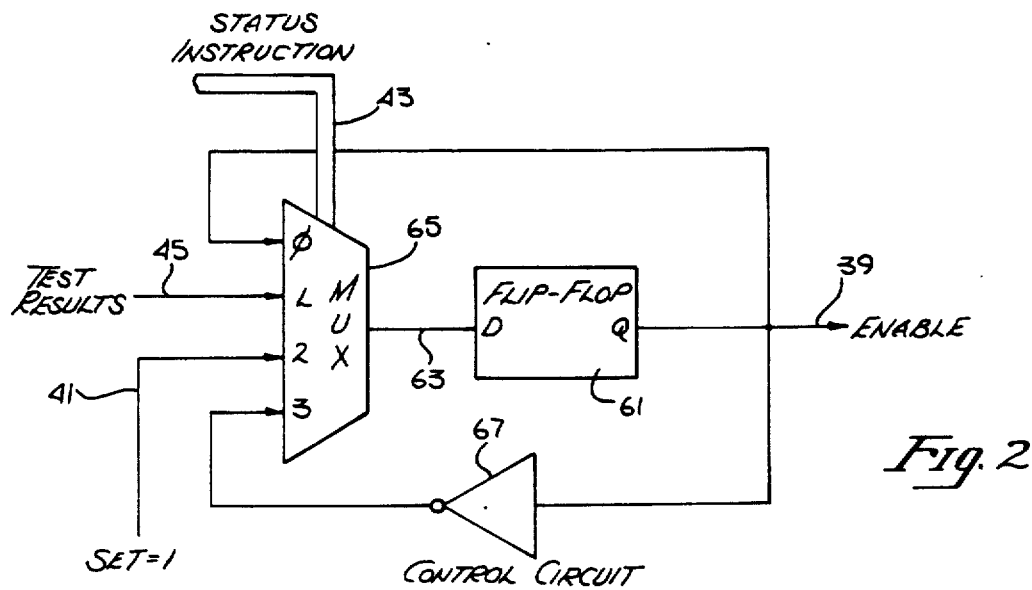
FIG. 2 illustrates a first circuit embodiment of the control circuits of the system of FIG. 1.
FIGS. 3 and 4 are tables which illustrate the operation of the system of FIG. 1 when implemented with the control circuit of FIG. 2.

The function of the control circuits in the system of FIG. 1 is explained more fully with respect to its two preferred embodiments, one embodiment illustrated in FIGS. 2-4 and another in FIGS. 5-7. But before proceeding to those embodiments, some general items of the system of FIG. 1 are first explained. The processor instructions in the bus 35 and the status instructions 43 originate from a micro-programmed control unit such as micro-sequencer 47. A micro-programmed control unit consists of the micro-program memory and the structure required to determine the address of the next microinstruction, specific implementations being well known.

A logic circuit 49 has as inputs the individual test result lines of each of the processing elements. The logic circuit 49 generates a condition code in an output line 51 when the signals in the input test result lines are a particular one or more combinations. The signal in the line 51 is connected to the condition code input of the micro-sequencer 47, thus enabling a change in the sequence of instructions in response to a particular combination of test result outputs. Another input to the logic circuits 49 is by way of a line 53, an instruction field of the micro-sequencer 47.

In a particular implementation of the system of FIG. 1 for color computer graphics processing, each of the processing elements contains as primary components a 16-bit multiplier and a 16-bit arithmetic and logic unit (ALU). Extremely fast processing is desired in computer graphics applications because of the large number of pixels in each frame of a picture, each pixel being defined by four 16-bit words.

Referring to FIG. 2, a circuit is shown that is suitable for use, according to one embodiment, as each of the control circuits shown in FIG. 1, such as the circuit 37. A flip-flop circuit 61 has its output connected to the enable line 39. An input line 63 is connected to an output of a four-position multiplexer 65. The multiplexer 65 has four separate inputs 0-3. The status instruction in the bus 43 selects which of the inputs 0-3 is connected to the output 63. The 0 input of the multiplexer is connected directly to the output of the flip-flop 61, thereby allowing the current state of the flip-flop 61 to be held when the multiplexer 65 is switched to its 0 input. Conversely, when switched to its number 3 input, the state of the flip-flop 61 is changed since its output is connected through an inverter 67 back to its input. The number 1 and number 2 position input positions of the multiplexer 65 are the test result line 45 and the set line 41, respectively, previously discussed with respect to FIG. 1.

The specific circuit examples being described are particularly adapted for executing IF-THEN-ELSE program instructions. The table of FIG. 3 summarizes the four possible states of the control circuit of FIG. 2, depending upon the status instruction on the bus 43. When the multiplexer 65 is switched to its 0 input, the output in the line 39 is held, the condition desired when the logical operation commanded by the instruction on the bus 35 of FIG. 1 is to execute a statement. The next status instruction, selecting the 1 input of the multiplexer 65, causes the test result of its associated processing element to be stored, as previously described, an operation that accompanies an IF instruction in the bus 35. The status instruction 2 causes the flip-flop 61 to be set, a status instruction on bus 43 that accompanies an END IF instruction in the processing element instruction bus 35. Lastly, a status instruction 3 causes the flip-flop element 61 to change state in order to enable those processors previously disabled, and conversely to disable those processors previously enabled. The status instruction 3 is presented in the bus 43 simultaneously with the ELSE instruction in the bus 35. Micro-code in the micro-sequencer 47 assures that the instructions in the buses 35 and 43 correspond according to the table of FIG. 3 in accordance with other particular requirements of any application.

The table of FIG. 4 better explains the operation of the circuit of FIG. 1, when using a control circuit of FIG. 2, by a specific example. Consider the example of an IF statement asking whether the data input to each processing element ($D_j$) is greater than 1. As shown in line 2 of the table of FIG. 4, it is assumed in the "test result" column that the first and third processing elements have passed the test, thus showing the logical "1" in their test result output lines 45, while the second and fourth processors have failed the test, and thus show a test result logical signal of "0". Even though each processor is executing the same IF instruction, the results of the rest performed by each can be different because the data being processed by each is generally different.

At the same time the IF instruction is being executed, the status instruction on the bus 43 causes the multiplexer 65 of each of the control circuits of the system of FIG. 1 to switch to its position 1 to receive the test results from their corresponding processors. These test results, whether a test pass "1" or fail "0", are then stored in the individual flip-flop elements. The enable signal outputs of the four flip-flops are given as the enable signals in the table of FIG. 4, referred to interchangably in this example as "run flags". At line 2 of the table of FIG. 4, the run flags are causing those processing elements who pass the test to be enabled and those who did not to be disabled. Those which are enabled are then caused, as shown in the line 3 of the table of FIG. 4, to execute a statement, in this example chosen to be to set the data output ($D_O$) equal to 1 of the enabled processing elements. The disabled processing elements do nothing at this time.

An ELSE instruction is next presented to all the processing elements for execution, which is to say that those processors who failed the IF test are now going to be called upon to do something different, as illustrated in lines 4 and 5 of the table of FIG. 4. The ELSE processor instruction is accompanied by the status instruction 3 which causes the control circuits, illustrated in FIG. 2, to all invert the states of their flip-flops. That can be seen by comparing the run flags of lines 3 and 4 of FIG. 4, one being the complement of the other. Once the processors previously disabled are enabled, a statement is executed, as shown in line 5 of FIG. 4, wherein in this example the output data value is set equal to the input data value. The result of the routine illustrated in FIG. 4 is thus to set the value of the data output lines 27 and 31 equal to 1, and output lines 29 and 33 equal to the value of the corresponding data input. Complementary operation of the processors to execute the IF and ELSE instructions is made possible by a simple provision in each of the control circuits for inverting all of their states in response to a single status instruction.

The logic circuits 49 of FIG. 1 are useful for detecting conditions where, because of a particular combination of input data, certain instructions need not be executed In such a case, the micro-sequencer 47 is then caused to skip the unexecutable instructions. Logic circuits 49 may be omitted in implementations where unexecuted instruction sequences may be allowed to occur. In the example of FIG. 4, if the test results shown in line 2 had all been 0, then there is no need to execute the statement of line 3 since all processors would be disabled. For this particular example, therefore, the logic circuits 49 are designed to detect when all processor test results are false (0) and causes the condition code in the line 51 to change, with the resultant change of the instruction sequence issued by the micro-sequencer 47. Additionally, if the test results are all true (1), then the instructions at lines 4 and 5 of FIG. 4 do not need to be executed, so the condition code in the line 51 can cause that instruction sequence to be bypassed, as well. A signal in line 53 functions to allow testing for any false (0) condition or any true (1) condition. Thus, the ability is provided (in conjunction with the status instruction on the bus 43) for testing for any or all conditions true or false.

An example of specific logic for carrying out these functions is given in FIG. 8. An OR gate 52 has as its inputs the test result lines from all of the processing elements. The gate's output is one input of an exclusive OR gate 54, the select line 53 being the second input. The output of the gate 54 is the condition code line 51. The gate 54 operates to pass through the output of the gate 52 when the select line 53 is false (0), and to pass a complement of that output when the line 53 is true (1).

Certain applications will require the ability of the individual processing element control circuits to handle a set of instructions that is nested within an IF-THEN-ELSE series of instructions. When this is required, the run flags determined as the result of executing the IF instruction are stored while the nested set of instructions is being executed. Once the nested instructions have been executed, the stored run flags are called out of memory so that the remainder of the IF-THEN-ELSE set of instructions can be executed.

The control circuit of FIG. 5 allows such nested program instruction operation. Added to the system circuit of FIG. 1 is a stacked memory 81, and associated controlling decoder circuits 83. The circuits within the dotted outline of FIG. 5 are not repeated within each of the four control circuits of FIG. 1, but rather are shared by them. The decoding circuits 83 respond to status instructions in the bus 43 to cause the current enable signals (run flags) of each of the control circuits to be stored in the stack memory 81 (a "push") through lines 85 or to be read from memory (a "pop") through lines 87. As is well known, stack memories read ("pop") the last written ("pushed") data. And each time data is written when there already is data in the stack memory, the existing data is pushed to a lower level in a manner that it can be read out of the memory only after the most recently written data is read out. In other words, data is read out in a first-in, last-out sequence.

Returning to FIG. 5, the circuitry of each of the four control circuits of FIG. 1 is described for this embodiment. A flip-flop 91 of the same type used in the embodiment of FIG. 2 is employed, with this output being the enable signal, one bit of the four-bit run flag. Its input in a line 93 is also connected to an output of a multiplexer 95. The multiplexer, however, has five positions 0–4, one more than used in the embodiment of FIG. 2. One of these inputs is selected at a time for connection to the input of the flip-flop 91 by the status instruction in the bus 43. The 0 input is connected directly to the flip-flop output, thus serving to hold the flip-flop in whatever state it is found when switched to that position. Input 1 of the multiplexer receives the output of AND gate 97, having as one input the output of the flip-flop 91 and as the other input test result line 45 of its associated processor. As indicated in the table of FIG. 6, the status instruction 1 is also decoded by circuits 83 to store ("push") at the top of the stack memory 81 the output (run flags) of the flip-flops within the control circuits of FIG. 1.

Multiplexer input 2 is connected to the set line 41. Input number 3 is connected to the stack memory 81 for setting the flip-flops in accordance with what has previously been recorded at the top of the stack. The decoding circuits 83 cause the top stack data of the memory 81 to pop when the status instruction 3 is received.

The last input of the multiplexer 95, switched in response to a status instruction number 4, receives the output of another AND gate 99 whose two inputs are connected to the stack memory output and the output of the flip-flop 91 through an inverter 101. The result is to AND together the data stored at the top of the stack and a complement of the current run flags.

The control circuit of FIG. 5, whose logical operation is shown in the table of FIG. 6, is especially adapted for carrying out the sequence of operations given in FIG. 7. In that sequence, an IF-THEN-ELSE sequence of program instructions is executed at lines 1, 2, 3, 9, 10, 11, 17, 18, and 19. Nested inside the IF or ELSE portions of that set of instructions is yet another IF-THEN-ELSE series of instructions, at lines 4–8. Similarly, a second set of such statements is nested at lines 12–16 within the basic sequence of instructions. In each of the three IF-THEN-ELSE series of instructions, a different test result is assumed, as shown in the "test result" column of FIG. 7. These different test results cause different run flags for each of the three IF-THEN-ELSE series of instructions. The dotted arrows show the flow of run flag bits in the course of the operation of the stack memory 81, those arrows pointing generally to the right being the result of a push operation and those generally to the left the result of a pop operation.

Although the various aspects of the present invention have been described with respect to its preferred embodiments, it will be understood that this invention is entitled to protection within the full scope of the appended claims.

It is claimed:

1. A processing system for providing parallel processing in a conditional branching environment without prescheduling and pre-formatting of instructions, said processing system comprising:
   a plurality of processing means, said processing means coupled in parallel to a first bus;
   a plurality of data lines, each of said plurality of said processing means coupled to corresponding one of said plurality of data lines;
   a plurality of control registers, each of said control registers coupled to corresponding one of said plurality of processing means, said control registers for enabling and disabling said processing means, said control registers coupled in parallel to a second bus;
   programming means coupled to said first and second bus, said programming means for providing instructions to said processing means on said first bus for testing data produced by said processing means and for providing enable signals to said control registers on said second bus;
   a plurality of output buses, each of said output buses coupled to corresponding one of said plurality of processing means and to said programming means;
   said programming means providing an instruction sequence of at least first and second instructions on said first bus to each of said processing means in time sequence, said first instruction executed by each of said processing means producing data on said plurality of output buses, said data tested by said programming means against a common condition, said programming means outputting on said second bus an enable signal to certain of said plurality of control registers, said certain of said control registers providing said enable signal to said processing means such that said second instruction is executed only in those processing means where said test of said data has provided a certain pre-defined result, said programming means then outputting a signal which enables the disabled processing means and disables the previously enabled processing means, and at least a third instruction nested between said first and second instructions is executed in those now enabled processing means where said test of said data has not provided said certain pre-defined result;
   storage means coupled to said control registers for temporarily storing the contents of said control registers when said at least third instruction is executed between said first and second instructions during conditional branching of said instruction sequence, said storage means retaining the results of the test of said first instruction and providing said results to said control registers for execution of said second instruction when said conditional branching is completed.

2. The system of claim 9 wherein said first instruction includes an IF instruction and said second instruction includes an ELSE instruction.

3. A processing means for providing parallel processing in a conditional branching environment without prescheduling and pre-formatting of instructions, said processing means comprising:
   first, second, third and fourth processors, said processors coupled to red, green, blue and alpha (RGBA) data channels respectively, said data channels providing data to said processors said processors having first, second, third and fourth outputs, respectively, said outputs of said processors coupled to a first bus;
   first, second, third and fourth control registers coupled to said first through fourth processors respectively and to a second bus;
   program sequencing means coupled to said first bus and said second bus, said sequencing means providing at least first and second instructions in time sequence to said processors, causing each of said processors to execute said first instruction and produce a first output signal;
   said first output signal tested by said sequencing means against a common condition, said sequencing means outputting an enable signal on said second bus to certain of said control registers, said certain control registers providing said enable signals to said processors such that said second instruction is executed only in those processors where the test of said first output signal has provided a certain pre-defined result, said sequencing means then outputting a signal which enables the disabled processors and disables the previously enabled processors, and at least a third instruction nested between said first and second instructions is executed in those now enabled processing means where said test of said data has not provided said certain pre-defined result;
   said first instruction including an IF instruction, said second instruction including an ELSE instruction;
   storage means coupled to said registers for temporarily storing the contents of said registers, wherein said at least third instruction is executed between said first and second instructions while said storage means retains the results of the test of said first instruction and provides said results to said control registers for execution of said second instruction.

* * * * *